United States Patent [19]

Wilson

[11] 4,129,323
[45] Dec. 12, 1978

[54] LOCKABLE HOSE COUPLING

[75] Inventor: Richard L. Wilson, Monroeville, Pa.

[73] Assignee: Westinghouse Air Brake Company, Wilmerding, Pa.

[21] Appl. No.: 815,618

[22] Filed: Jul. 14, 1977

[51] Int. Cl.² ............... B60D 1/08; B61G 5/08; F16L 37/12
[52] U.S. Cl. ............................ 285/69; 285/87
[58] Field of Search ............... 285/69, 68, 88, 87, 285/84, 82, 319, 320, 79, 72, 71, 70; 292/87, DIG. 15

[56] References Cited

U.S. PATENT DOCUMENTS

| | | | |
|---|---|---|---|
| 554,192 | 2/1896 | Monroe | 292/87 |
| 955,595 | 4/1910 | Kingston et al. | 285/70 X |
| 1,250,336 | 12/1917 | Mooney | 285/69 |
| 1,589,352 | 6/1926 | Boardman | 292/87 |
| 1,622,216 | 3/1927 | Anlauf et al. | 285/88 |
| 2,221,959 | 11/1940 | Visser | 292/87 X |
| 2,372,070 | 3/1945 | Fergueson et al. | 292/87 X |
| 3,879,066 | 4/1975 | Kozinski | 285/87 X |
| 3,892,431 | 7/1975 | Booth | 285/79 X |
| 3,941,254 | 3/1976 | Sweger | 285/69 X |

FOREIGN PATENT DOCUMENTS

| | | | |
|---|---|---|---|
| 1204317 | 1/1960 | France | 285/319 |
| 388777 | 1/1924 | Fed. Rep. of Germany | 285/69 |

OTHER PUBLICATIONS

"Windproofing Doors that Slam," by R. W. Bostrom, from Popular Science of Nov. 1959, p. 191.

Primary Examiner—Mervin Stein
Assistant Examiner—Carl F. Pietruszka
Attorney, Agent, or Firm—W. F. Poore; R. W. McIntire, Jr.

[57] ABSTRACT

This invention relates to a hose coupling having mounted thereon a leaf spring locking member of such a configuration that the free end is so disposed that it constitutes a stop which is shiftable by the guard arm of the other one of a pair of hose couplings out of the pathway of this guard arm on the other one of the hose couplings as the one hose coupling and the arm thereon are rotated toward the fully coupled position of the pair of hose couplings. The configuration of the stop is such that the resiliency of the leaf spring locking member, upon the pair of couplings reaching their fully coupled position in which the arm passes out of contact with the stop, shifts this stop to a position in the pathway of the arm thereby preventing unwanted uncoupling of the pair of fully coupled hose couplings until the leaf spring is manually deflected to shift the stop out of the pathway of the guard arm.

5 Claims, 2 Drawing Figures

LOCKABLE HOSE COUPLING

BACKGROUND OF THE INVENTION

In the U.S. Pat. No. 458,542, issued Aug. 25, 1891 to Thomas W. Welsh, and assigned to the assignee of the present application, there is shown and described a pair of pipe or hose couplings, the construction and manual operation of which is substantially the same as the hose couplings used on the rolling stock owned by the American railroads to couple the air hoses at the adjacent ends of each pair of railway vehicles in a train to form a continuous train brake pipe that extends from the locomotive to the back end of the last car in the train. Unwanted uncoupling of a pair of coupled hose couplings may occur as the result of a piece of flying ballast, or other object, striking one of the couplings with a force of such magnitude that the struck coupling is rotated relative to the other coupling a sufficient amount to cause uncoupling of the two coupled hose couplings. Such an unwanted uncoupling of the two coupled hose couplings effects a release of fluid under pressure from the train brake pipe at an emergency rate which causes an undesired emergency brake application to be effected on each vehicle in the train thereby bringing the train to a stop. Such an undesired stop increases the time for the train to travel between two terminals and, therefore, causes an increase in the cost of operating the train.

Accordingly, it is the general purpose of this invention to provide a novel hose coupling that has mounted thereon one end of a leaf spring locking member of such a configuration that the other or free end thereof is so disposed that it constitutes a stop which is shiftable by the guard arm of the other one of a pair of hose couplings out of the pathway of this guard arm on the other one of the hose couplings as the one hose coupling and the guard arm thereon are rotated toward the fully coupled position. The configuration of this stop is such that the resiliency of the leaf spring locking member, upon the pair of hose couplings reaching their fully coupled position in which the guard arm passes out of contact with the stop, shifts this stop to a position in the pathway previously traveled by the guard arm to thereby prevent unwanted uncoupling of the pair of fully coupled hose couplings until the leaf spring locking member is manually deflected to shift the stop out of the pathway of the guard arm.

SUMMARY OF THE INVENTION

According to the present invention, the hollow body of a hose coupling has cast therewith on the exterior thereof a mounting boss to which is secured one end of a leaf spring locking member that extends longitudinally along the outside of the body toward the lip bead on the outer end of this body. The other or free end of this leaf spring locking member is of such a configuration as to constitute a stop which is shiftable by the guard arm of the other one of a pair of hose couplings out of the path of this guard arm on the other one of the hose couplings as the one hose coupling and its guard arm are rotated toward the fully coupled position. The configuration of this stop is such that the resiliency of the leaf spring locking member, upon the pair of hose couplings reaching their fully coupled position in which the guard arm passes out of contact with the stop, shifts this stop to a position in the pathway previously traveled by the guard arm to thereby prevent unwanted uncoupling of the pair of fully coupled hose couplings until the leaf spring locking member is manually deflected to shift the stop out of the path of the guard arm to permit the guard arm to travel the same pathway to the uncoupled position that it traveled upon its rotation to the fully coupled position.

DESCRIPTION

Figure 2:
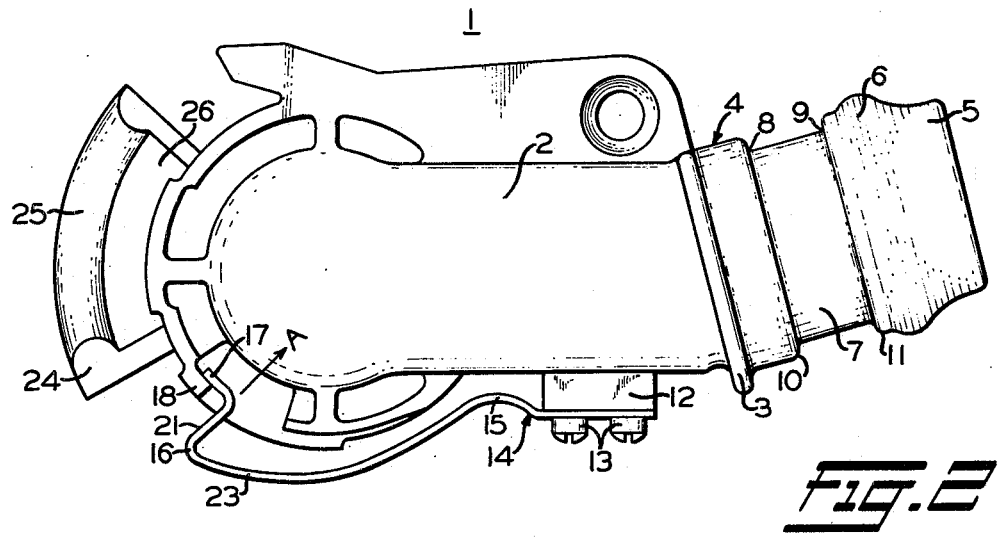
FIG. 2 is a top view of the hose coupling shown in FIG. 1.
Figure 1:
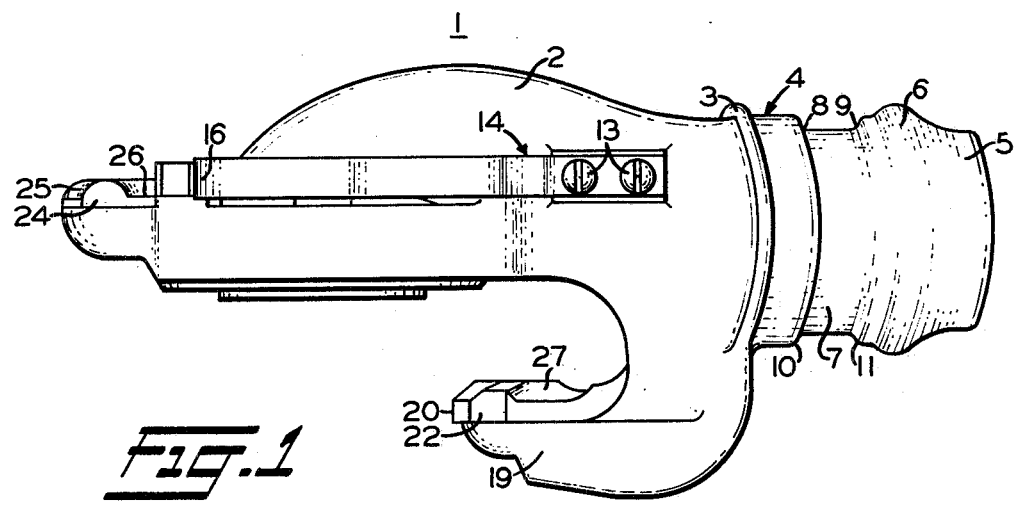
FIG. 1 is an elevational view of a hose coupling embodying the invention.

As shown in FIGS. 1 and 2, a novel hose coupling 1 comprises a hollow body 2 that has formed integral therewith at the right-hand side a hose stop 3, a nipple 4, it being apparent from FIG. 2 that the center line of this nipple 4 forms an obtuse angle with the horizontal center line of the hollow body 2.

The nipple 4 comprises a boss-receiving end or annular lip 5 at the left-hand end of which is an annular bead 6. This bead 6 has a smooth rounded contour for facilitating the application of a hose onto the nipple 4.

As shown in FIGS. 1 and 2, a shallow annular groove 7 is formed in the sealing portion of the nipple 4 substantially midway between the two ends of the nipple and has two oppositely facing shoulders 8 and 9 at the respective ends thereof. These shoulders 8 and 9 have rounded edges 10 and 11, it being noted that the rounded edge 11 extends from the shoulder 9 to the annular bead 6.

A hose (not shown) is forced over the annular lip 5, the bead 6 and groove 7 until the end of this hose abuts the hose stop 3. The hose is then secured to the nipple 4 by a band or hose clamp (not shown) which is applied by a suitable hose clamping machine, such as that disclosed in U.S. Pat. No. 2,729,994, issued to Ellis E. Hewitt et al. on Jan. 10, 1956, reissued as U.S. Pat. No. Re. 24,636 on Apr. 21, 1959, and assigned to the assignee of the present invention.

According to the present invention, the hollow body 2 has cast integral therewith on the exterior thereof a mounting boss 12. This boss 12 is provided with two spaced-apart screw-threaded bottomed bores (not shown) for receiving therein a pair of screws 13 that extend through a pair of spaced-apart smooth bores (not shown) provided in a leaf spring locking member 14 adjacent its right-hand end.

The configuration of the leaf spring locking member 14 is shown in FIG. 2, it being apparent that this member 14 is so bent intermediate the ends thereof as to form a substantially S-shaped portion 15 that is disposed generally parallel to the side of but not normally making abutting contact with the body 2.

As further shown in FIG. 2, the locking member 14 is so bent, adjacent the left end of the S-shaped portion 15, as to form a stop 16. The left-hand leg of this V-shaped stop 16 is bent away therefrom and toward the left, as viewed in FIG. 2, to form a safety tab 17. This safety tab 17 is so disposed relative to an arcuate rib 18, which is cast integral with the body 2, that the inherent resiliency of the leaf spring locking member 14 normally biases this tab 17 into contact with the inner side of rib 18, as shown in FIG. 2.

While the tab 17 is biased against the rib 18, as shown in FIG. 2, the stop 16 is so disposed as to lie in the pathway of travel of a guard arm 19 of the other one of a pair of hose couplings 1 when two of these hose couplings 1 are manually coupled together. Accordingly, when the hose coupined 1 shown in FIGS. 1 and 2, and having secured thereto the leaf spring locking member 14, is manually rotated relative to the other one of a pair of hose couplings to be manually coupled, an arcuate surface 20 on the guard arm 19 of this other one of the pair of couplings will first be brought into abutting relationship with the apex of the V-shaped stop 16 on the leaf spring locking member 14 that is secured to this hose coupling 1.

Thereafter, as this one hose coupling is manually rotated relative to the other one of the pair of hose couplings being manually coupled, the arcuate surface 20 on the guard arm 19 of this other one of the hose couplings bears against the apex of the V-shaped stop 16 that is being rotated with the one hose coupling and, by reason of the resiliency of the leaf spring locking member 14 on which this V-shaped stop member 16 is formed, deflects this leaf spring locking member 14 clockwise, as viewed in FIG. 2, about the screws 13, and thereby moves this V-shaped stop member 16 in the direction of the arrow A shown in FIG. 2.

Now, as the one hose coupling continues to be manually rotated relative to the other one of the pair of hose couplings being manually coupled, the arcuate surface 20 on the guard arm 19 of the other one of the hose couplings causes further deflection of the leaf spring locking member 14 about the screws 13 to further shift the V-shaped stop member 16 in the direction of the arrow A shown in FIG. 2.

As the apex of the V-shaped stop member 16 slides along the arcuate surface 20 on the guard arm 19 of the other one of the hose couplings in response to the manual rotation of the one hose coupling carrying this stop member 16, it will be further shifted in the direction of the arrow A shown in FIG. 2.

This shifting of the stop member 16 in the direction of the arrow A will continue until the apex of this stop member 16 reaches the end of the arcuate surface 20 on the guard arm 19 of the other one of the hose couplings.

Thereafter, as the one hose coupling is rotated relative to the other hose coupling to the fully coupled position of the pair of hose couplings, the apex of the stop member 16 being rotated with the one hose coupling will reach the end of the arcuate surface 20 on the guard arm 19 of the other hose coupling and then ride off the end of this arcuate surface 20 on the guard arm 19 of the other hose coupling.

As the apex of the stop member 16 of the leaf spring locking member 14 secured to the one hose coupling thus rides off the end of the arcuate surface 20 on the guard arm 19 of the other hose coupling, the inherent resiliency of this leaf spring locking member 14 will quickly shift or snap the stop member 16 that is a part of this locking member 14 back to the position in which this locking member 14 and V-shaped stop 16 are shown in FIG. 2 of the drawing.

With the stop member 16 of the leaf spring locking member 14 carried by the one hose coupling now returned to the position shown in FIG. 2, this stop member 16 will be so disposed that a flat side 21 on this stop member 16 will abut a flat surface 22 on the guard arm 19 of the other hose coupling if now either one of the two fully coupled hose couplings be rotated with respect to the other in the direction to effect uncoupling of the two coupled hose couplings.

It should be understood that the other hose coupling may be provided with a leaf spring locking member 14 that is identical to the locking member 14 carried by the one hose coupling 1.

It should be further understood that the locking member 14 carried by the other hose coupling and the guard arm 19 of the one hose coupling operate in the manner described above when the two hose couplings are manually coupled by the trainman.

Therefore, if either one of the two fully coupled hose couplings is rotated, relative to the other one of these hose couplings, in the uncoupling direction, the flat side 21 on the stop 16 of the leaf spring locking member 14 carried on the hose coupling being rotated is rotated into abutting relationship with the flat surface 22 on the guard arm 19 of the other hose coupling that is not being rotated.

Likewise, if the other one of the hose couplings is rotated relative to the one hose coupling in the uncoupling direction, the flat side 21 on the stop 16 of the leaf spring locking member 14 carried on the other one of the hose coupling being rotated is rotated into abutting relationship with the flat surface 22 on the guard arm 19 of the one hose coupling that is not being rotated.

From the foregoing, it is apparent that while the flat side 21 on the stop 16 carried on each hose coupling abuts the flat surface 22 on the guide arm 19 of the other hose coupling, neither of the hose couplings can be further rotated, relative to the other, in the uncoupling direction to effect uncoupling of the two coupled hose couplings.

According, it is apparent that if a flying piece of ballast, or some other object, strikes either of the two coupled hose couplings and imparts a force to the struck hose coupling so that this force acts on this struck hose coupling in the direction to rotate it, relative to the other hose coupling, in the uncoupling direction, an unwanted uncoupling of the two hose couplings is not effected since the flat side 21 on the stop 16 carried by each of the hose couplings abuts the flat surface 22 on the guard arm 19 of the other hose coupling. Thus, neither hose coupling can be rotated, relative to the other, in the uncoupling direction. Consequently, an unwanted uncoupling of the two coupled hose couplings by the piece of flying ballast, or other object, is prevented.

It should be understood that providing each of a pair of hose couplings 1 with a leaf spring locking member 14 having a stop 16 does not prevent automatic uncoupling of two coupled hose couplings when the car couplers of two adjacent coupled cars are uncoupled and one car is pulled away from the other by a locomotive.

When one car is pulled away from the other, the abutting resilient gaskets carried in the two coupled hose couplings are compressed to permit automatic uncouplings, as in conventional hose couplings.

It should be noted that when one car is pulled away from the other by the locomotive, the flat side 21 on the stop 16 of the locking member 14 secured to the hose coupling that is attached to the outer end of the hose on the car being pulled away by the locomotive is moved away from the flat surface 22 on the guard arm 19 of the hose coupling that is attached to the outer end of the hose at the adjacent end of the car that remains stationary. Likewise, when one car is pulled away from the other, the flat surface 22, on the guide arm 19 of the hose coupling that is attached to the outer end of the hose at the adjacent end of the car being pulled away by the locomotive, is moved away from the flat surface 21 on the stop 16 of the leaf spring locking member 14 that is secured to the hose coupling which is attached to the outer end of the hose at the adjacent end of the car that remains stationary.

Usually, a pair of coupled hose couplings are uncoupled automatically by a locomotive pulling one car away from the other, as described above.

However, if two hose couplings 1 embodying the present invention are fully coupled, they may be manually uncoupled by a trainman in the manner now to be described.

The trainman will grasp one hose coupling with one of his hands and the other hose coupling with his other hand.

Next, by use of his thumb on this one hand, he will apply pressure at the point denoted by the numeral 23 to the leaf spring locking member 14 that is secured to the mounting boss 12 of the one hose coupling.

Manual pressure thus applied at the point 23 will deflect this leaf spring locking member 14 in the direction to shift the stop 16 thereon in the direction of the arrow A shown in FIG. 2.

Accordingly, this stop 16 is thus shifted to a position in which it is no longer in the pathway of the flat surface 22 on the guard arm 19 of the other hose coupling.

By use of his thumb on his other hand, the trainman will shift the stop 16 on the leaf spring locking member 14 carried by the other hose coupling to a position in which it is no longer in the pathway of the flat surface 22 on the guide arm 19 of the one hose coupling.

Now, either of the two hose couplings may be manually rotated relative to the ohter, in the uncoupling direction, until the uncoupled position is reached.

Thereafter, each of the hose couplings may be manually moved away from the other to thereby effect a complete uncoupling of the two hose couplings.

It will be noted from FIGS. 1 and 2 that the hose coupling 1 has cast integral therewith an arcuate lip 24 provided with a lip bead 25 on which is formed a lip bearing surface 26. This arcuate lip 24, lip bead 25 and lip bearing surface 26 have the same shape and size and serve the same purpose as the lip, lip bead and lip bead bearing surface provided on conventional hose couplings now used on American railroads.

Furthermore, the guard arm 19 is provided with a guard arm groove 27 for receiving therein the lip bead 25 on the other one of a pair of hose couplings 1 when they are coupled together. This guard arm groove 27 has the same size and shape as the guard arm groove provided in the guard arm of conventional hose couplings.

From the foregoing, it is apparent that the hose coupling 1 embodying the invention can be manually coupled to a conventional air hose coupling.

Furthermore, these two hose couplings can be automatically uncoupled by a locomotive pulling one car away from another subsequent to uncoupling the car couplers at the adjacent ends of two coupled cars.

Having now described the invention, what I claim as new and desire to secure by Letters Patent, is:

1. A hollow hose coupling comprising:
   (a) a hollow body having integral therewith an arcuate lip with a lip bead on which is formed a lip bearing surface and a first guard arm having a guard arm groove for receiving therein the lip bead of a second one of a pair of coupled hose couplings, wherein the improvement comprises:
   (b) a mounting boss fixed to the outside of said hollow body, and
   (c) a leaf spring locking member mounted by one end thereof on said mounting boss and having formed intermediate the ends thereof a substantially S-shaped portion normally disposed generally parallel to the side of and out of contact with said body, said leaf spring locking member having formed on the other end thereof a stop that is shiftable by a second guard arm of said second one of said pair of hose couplings out of the pathway of said second guard arm as said second guard arm is rotated toward the fully coupled position of the pair of hose couplings, the configuration of said stop being such and responsive to the resiliency of said leaf spring locking member that, upon attainment of said fully coupled position, in which said second guard arm moves out of contact with said stop, said stop is moved into the pathway of said second guard to inhibit relative rotation of the hose couplings and consequent undesirable uncoupling thereof,
   (d) said S-shaped portion and stop being yieldingly movable, upon application of manual force thereon, toward said body and an unlocking position in which said stop is moved out of the pathway of said second guard arm so that said hose couplings may be relativey rotated to an uncoupled disposition.

2. A hose coupling, as recited in claim 1, further characterized in that said stop formed on said other end of said locking member is substantially V-shaped, the apex of said V-shaped stop being so disposed as to lie in said pathway of the second guard arm so that when two hose couplings are manually coupled, the second guard arm strikes said stop and causes sufficient deflection of said locking member so as to shift said stop out of the pathway of the second guard arm as said pair of hose couplings are rotated toward their fully coupled position.

3. A hose coupling, as recited in claim 2, further characterized in that the resiliency of said leaf spring locking member is effective to shift the apex of said stop into the pathway of the second guard arm upon said pair of hose couplings reaching substantially their fully coupled position for locking said pair of hose couplings in said fully coupled position.

4. A hose coupling, as recited in claim 3, further characterized in that the resiliency of said leaf spring locking member enables manual shifting of the apex of said stop out of the pathway of the guard arm on said like hose coupling to provide for manual uncoupling of said pair of coupled hose couplings.

5. A hose coupling, as recited in claim 3, further characterized in that the resiliency of said leaf spring locking member enables automatic uncoupling of a pair of coupled hose couplings, when the vehicle to which one hose coupling is attached is moved away from the vehicle to which the other hose coupling is attached.

* * * * *